United States Patent
Glaser et al.

(10) Patent No.: US 11,797,921 B2
(45) Date of Patent: Oct. 24, 2023

(54) DYNAMIC PRODUCT MARKETING THROUGH COMPUTER VISION

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 188 days.

(21) Appl. No.: 17/003,909

(22) Filed: Aug. 26, 2020

(65) Prior Publication Data
US 2021/0065217 A1     Mar. 4, 2021

Related U.S. Application Data

(60) Provisional application No. 62/891,894, filed on Aug. 26, 2019.

(51) Int. Cl.
| | | |
|---|---|---|
| *G06Q 10/00* | (2023.01) | |
| *G06Q 10/087* | (2023.01) | |
| *G06Q 30/0201* | (2023.01) | |
| *G06Q 10/0637* | (2023.01) | |
| *G06V 20/52* | (2022.01) | |
| *G06V 40/20* | (2022.01) | |
| *G06F 18/21* | (2023.01) | |
| *G06F 18/2413* | (2023.01) | |
| *G06V 10/764* | (2022.01) | |
| *G06V 10/82* | (2022.01) | |
| *G06N 3/08* | (2023.01) | |

(52) U.S. Cl.
CPC ....... *G06Q 10/087* (2013.01); *G06F 18/2163* (2023.01); *G06F 18/2413* (2023.01); *G06Q 10/0637* (2013.01); *G06Q 30/0201* (2013.01); *G06V 10/764* (2022.01); *G06V 10/82* (2022.01); *G06V 20/52* (2022.01); *G06V 40/20* (2022.01); *G06N 3/08* (2013.01)

(58) Field of Classification Search
None
See application file for complete search history.

(56) References Cited

U.S. PATENT DOCUMENTS

| | | | |
|---|---|---|---|
| 6,744,938 B1 * | 6/2004 | Rantze | ............... G06Q 30/06 382/312 |
| 7,195,157 B2 | 3/2007 | Swartz et al. | |

(Continued)

OTHER PUBLICATIONS

Spence, Charles, and Alberto Gallace. "Multisensory design: Reaching out to touch the consumer." Psychology & Marketing 28.3 (2011): 267-308. (Year: 2011).*

(Continued)

*Primary Examiner* — Gurkanwaljit Singh
(74) *Attorney, Agent, or Firm* — Alpine Patents LLC; Brian Van Osdol

(57) ABSTRACT

System and method for dynamic marketing of products that can include collecting image data; identifying a set of product instances within the environment; for each product instance of the set of product instances, analyzing image data of the product instance and thereby determining a product presentation variation associated with the product instance; detecting user-item interactions associated with the set of product instances; and analyzing user-item interactions associated with the set of product instances according to the product presentation variations.

20 Claims, 9 Drawing Sheets

(56) References Cited

U.S. PATENT DOCUMENTS

| | | | | |
|---|---|---|---|---|
| 8,452,868 | B2* | 5/2013 | Shafer | G06Q 10/087 |
| | | | | 340/568.1 |
| 9,600,840 | B1 | 3/2017 | Pope et al. | |
| 10,360,571 | B2* | 7/2019 | Garel | G06Q 30/0269 |
| 10,438,277 | B1 | 10/2019 | Jiang et al. | |
| 10,963,893 | B1* | 3/2021 | Sharma | G06K 9/6293 |
| 11,176,590 | B2* | 11/2021 | Dechu | G06Q 30/0641 |
| 2008/0021766 | A1* | 1/2008 | McElwaine | G06K 7/0008 |
| | | | | 340/630 |
| 2008/0043013 | A1* | 2/2008 | Gruttadauria | G06Q 30/02 |
| | | | | 345/419 |
| 2008/0208719 | A1 | 8/2008 | Sharma et al. | |
| 2008/0249858 | A1 | 10/2008 | Angell et al. | |
| 2011/0072132 | A1* | 3/2011 | Shafer | G06Q 10/087 |
| | | | | 709/224 |
| 2012/0029691 | A1* | 2/2012 | Mockus | G07F 9/023 |
| | | | | 700/231 |
| 2013/0073388 | A1* | 3/2013 | Heath | G06Q 50/01 |
| | | | | 705/14.53 |
| 2013/0073473 | A1* | 3/2013 | Heath | G06Q 30/0241 |
| | | | | 705/319 |
| 2013/0110652 | A1* | 5/2013 | Herring | G06Q 50/188 |
| | | | | 705/16 |
| 2013/0110666 | A1* | 5/2013 | Aubrey | G06V 40/103 |
| | | | | 705/26.5 |
| 2014/0365334 | A1 | 12/2014 | Hurewitz | |
| 2015/0112838 | A1* | 4/2015 | Li | G06Q 30/0623 |
| | | | | 705/26.61 |
| 2015/0127490 | A1* | 5/2015 | Puertas | H04M 1/72457 |
| | | | | 705/26.62 |
| 2015/0262236 | A1 | 9/2015 | Cypher et al. | |
| 2015/0324725 | A1 | 11/2015 | Roesbery et al. | |
| 2015/0363832 | A1* | 12/2015 | Bleckmann | G06Q 30/0267 |
| | | | | 705/14.64 |
| 2016/0134930 | A1* | 5/2016 | Swafford | A47F 5/0068 |
| | | | | 725/80 |
| 2016/0379225 | A1* | 12/2016 | Rider | G06Q 30/0201 |
| | | | | 382/116 |
| 2017/0228804 | A1* | 8/2017 | Soni | G06Q 30/0641 |
| 2017/0300999 | A1* | 10/2017 | Wilkinson | G06Q 90/00 |
| 2017/0364925 | A1* | 12/2017 | Wilkinson | G06Q 30/016 |
| 2018/0350144 | A1* | 12/2018 | Rathod | H04W 4/021 |
| 2019/0205933 | A1 | 7/2019 | Glaser et al. | |
| 2019/0282000 | A1* | 9/2019 | Swafford | A47F 5/0068 |
| 2020/0065748 | A1 | 2/2020 | Durkee et al. | |

OTHER PUBLICATIONS

Rowley, Jennifer. "Understanding digital content marketing." Journal of marketing management 24.5-6 (2008): 517-540. (Year: 2008).*

Rettie, Ruth, and Carol Brewer. "The verbal and visual components of package design." Journal of products, brand management 9.1 (2000): 56-70. (Year: 2000).*

Krishna, Aradhna, Luca Cian, and Nilüfer Z. Aydmoglu. "Sensory Aspects of Package Design." Journal of Retailing 93.1 (2017): 43-54. (Year: 2017).*

U.S. Appl. No. 17/139,827, filed Dec. 31, 2020, William Glaser.

* cited by examiner

```
┌─────────────────────────────────────────┐
│         Collecting image data S110       │
└─────────────────────────────────────────┘

┌─────────────────────────────────────────┐
│  Identifying item instances within the   │
│            environment S320              │
└─────────────────────────────────────────┘

┌─────────────────────────────────────────┐
│   For each item instance of the set of   │
│    item instances, analyzing image       │
│   data of an item instance and thereby   │
│    determining a product presentation    │
│   variation associated with the item     │
│            instance S330;                │
└─────────────────────────────────────────┘

┌─────────────────────────────────────────┐
│ Detecting user-item interactions         │
│ associated with the item instances S340  │
└─────────────────────────────────────────┘

┌─────────────────────────────────────────┐
│ Analyzing user-item interactions         │
│ associated with the set of item          │
│ instances according to the product       │
│ presentation variations S350             │
└─────────────────────────────────────────┘
```

FIGURE 5

DYNAMIC PRODUCT MARKETING THROUGH COMPUTER VISION

CROSS-REFERENCE TO RELATED APPLICATIONS

This Application claims the benefit of U.S. Provisional Application No. 62/891,894, filed on 26 Aug. 2020, which is incorporated in its entirety by this reference.

TECHNICAL FIELD

This invention relates generally to the field of retail marketing tools, and more specifically to a new and useful system and method for dynamic product marketing through computer vision.

BACKGROUND

The marketing and presentation of products can have a large impact on consumer perception and purchase decisions. In highly competitive spaces, such as a food products sold in a grocery store, marketing can make a large difference in altering consumer action. However, marketing within traditional retail environments is largely a manual process. Marketers may use focus groups or limited scope experimentation to understand impact of marketing. Similarly, once a marketing direction is implemented it can be hard to understand the impact of the marketing beyond general sales data. Data is severely limited and there are limited tools to use a data-driven approach to optimizing marketing of products. For example, different packaging variations of the same product SKU cannot be tracked using just sales data since the different variations appear as the same product in the sales records.

In particular, the data regarding product purchases broken down by marketing and presentation is typically not available or of very low fidelity. Large product suppliers may have small amounts of data such as gross sales information from point of sale systems or from product orders. Small product suppliers may not have any detailed information for how their products are selling. Product marketing strategy is often performed in large campaigns that generalize across a large number of stores.

Thus, there is a need in the retail marketing tool field to create a new and useful system and method for dynamic product marketing through computer vision. This invention provides such a new and useful system and method.

BRIEF DESCRIPTION OF THE FIGURES

FIGS. 4 and 5 are detailed flowchart representations of variations of a method;

DESCRIPTION OF THE EMBODIMENTS

Figure 1:
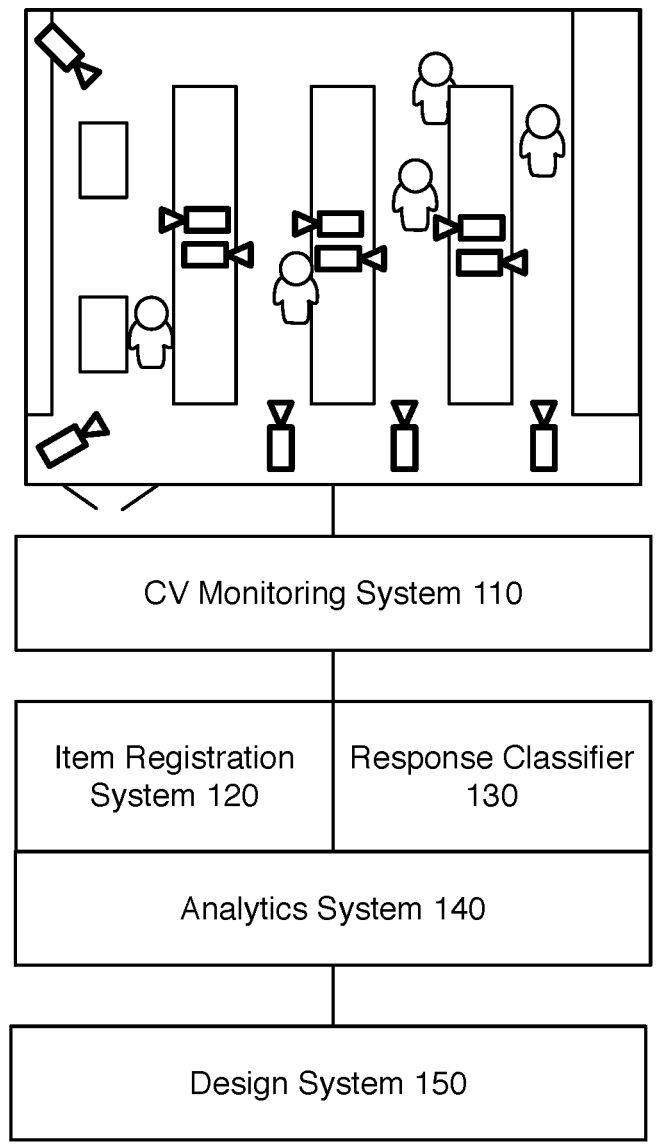
FIG. 1 is a schematic representation of a system of one embodiment.

The following description of the embodiments of the invention is not intended to limit the invention to these embodiments but rather to enable a person skilled in the art to make and use this invention.

1. Overview

A system and method for dynamic product marketing using computer vision preferably uses reactive tracking to monitor user responses to product marketing. The system and method can preferably track user responses across different various marketing strategy variations. In one preferred variation, the system and method can track performance of different product packaging variations. In another variation, the system and method can track performance of other factors such as signage and store layout. The system and method can be used to direct marketing strategies, dynamically alter product packaging or distribution of different product packaging variations, and used in other ways. The system and method can also be used to alter in store operations and presentation of products and/or marketing materials like signage.

The system and method preferably uses a computer vision (CV) monitoring system in collecting and tracking information. Computer vision can be used in understanding real-world status of how products are offered in a store and how users interact with the products. The system and method is largely dynamic so that products and marketing efforts can be implemented and the system and method automatically facilitates collection and use of data related to the impact of those marketing efforts.

The system and method may additionally or alternatively use other forms of monitoring systems. The additional or alternative monitoring systems can include smart shelves, RFID tracking tags, and/or other monitoring systems. The additional or alternative monitoring systems may include user-based applications for user self-checkout or other non-sensor systems that can be used for tracking user-item interactions.

The system and method is preferably operated across multiple sites. For example, the system and method can preferably be used in providing dynamic marketing tools across all grocery store locations of a grocery store chain. The system and method may alternatively be implemented and used within a single environment.

The system and method may be implemented as a standalone solution used exclusively for marketing and data-based operations within an environment. Alternatively, the system and method may be used with a CV-based monitoring system used in other capacities. In one preferred implementation, the CV-based monitoring system may additionally be used for other use-cases such as automated and/or semi-automated checkout.

The system and method may be used so that results of product marketing can be tracked, interpreted, and acted on. In some variations, product marketing may be tracked within an environment in a substantially uniform manner. In other variations, product marketing may be tracked in a variety of ways. In some implementations, the system and method may be configured to track different "campaigns", "experiments", and/or other types of groupings for marketing strategies. Within these groupings, the configuration of the system and method may enable customized tracking and actions that are tailored for the particular group. For example, the system and method may allow one set of product variations to be tracked to determine how graphical design of packaging impacts the age group of receptive audiences, while a second set of product variations can be tracked in how copy on the packaging concerning nutritional attributes changes conversions of product views to product purchases. The system and method can facilitate the selection of different marketing variations (e.g., product packaging, promotional sign designs, etc.), and coordinating production, shipping logistics, and/or other digitally managed aspects involved in directing different marketing efforts. For example, different promotional sign orders could be created so that signage customized to different store locations are automatically directed based on the system and method.

The system and method in one preferred variation can use CV monitoring for multivariate, multinomial, and/or A/B testing of marketing strategies. This can further be used in incrementally varying and ideally updating the marketing strategies to enhance results. The system and method may alternatively provide more enable high fidelity retail analytics.

The system and method can be implemented as an internal system so that an operating entity can manage and track marketing efforts. In this variation, the system and method may be operated as a single tenant system. For example, a store operator may use the system and method to internally study store marketing and presentation of products. This may be used within the store to improve planograms (e.g., product placement and facing), signage and/or other aspects.

The system and method, however, may additionally or alternatively be offered such that multiple different entities may each individually use the product marketing features of the system and method in their own customized manner. In one implementation, the system and method can serve as a multi-tenant system where different accounts can operate independently of the other accounts. In a multi-tenant variation, the system and method can be implemented as part of a marketing computing platform implemented as a SaaS (software as a service) platform accessible over a network. Access to data and product information and/or other permissions can be scoped by accounts. For example, product manufacturers and distributers may be limited to running and tracking product marketing campaigns related to their associated products.

The system and method is preferably used in a retail environment. A grocery store is used an exemplary retail environment in the examples described herein, however the system and method is not limited to retail or to grocery stores. In other examples, the system and method can be used in a super markets, department stores, apparel store, book store, hardware store, electronics store, gift shop, and/or other types of shopping environments. The system and method could additionally or alternatively be applied to any environment with variable marketing, signage, product/service presentations, and/or other variables for marketing.

The system and method can also be used in other forms of retail such as apparel and fashion where the product design may also serve as the "marketing" of that product. Furthermore, product details such as sizing, styles, material, and/or other features can be tracked so that their impact to sales can be understood and used. In the space of apparel and fashion, the system and method may be used to algorithmically alter design and production of goods. For example, manufacturing and design of clothing styles can be dynamically adjusted based on actual data. The system and method can reduce design and production from months to days or weeks and optionally fully automate the process. Fabric colors, graphical designs, detailing, product sizing, and/or other factors could be dynamically directed using the system and method. The system and method may be adapted to detecting and tracking try-ons, purchases, and put-backs (e.g., deciding to not buy after selecting a product).

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method is flexible to adapt to marketing conditions without prior knowledge. For example, the system and method can preferably respond automatically to a new packaging design. In this way, the system and method may be used to decouple coordination between product manufacturers and stores. This can additionally make the system and method responsive to dynamic marketing conditions such as an ad-hoc application of a promotional sticker or other changes in how a product is displayed and marketed.

As an additional or alternative potential benefit, the system and method can automatically detect and classify the presentation of a specific instance of the product in a store. This can simplify and enable the implementation of such marketing experiments by making it feasible to carry out such experiments. For example, if two variations of product packaging are produced, they may be shipped out in any suitable manner, and any store integrated into the operation of the system and method can automatically figure out the packaging variation present in the store. A store could include both variations or only one variation or even a variation not from the experiment, and the system could automatically adapt and appropriately track individual user responses to both. Such capabilities have yet been inaccessible using existing tools.

As another potential benefit, the system and method may function to enable automated marketing. The system and method can enable multivariate, multinomial, A/B testing, and/or other types of strategy comparisons to optimize or enhance marketing of a product. In some variations, the system and method can be integrated with design or marketing tools such that strategies can be varied and set automatically. For example, the design tool used to set the packaging production plans can be varied to adjust the graphics, copy, and/or other factors based on input from the system and method. In another implementation, digital displays used within a retail environment may be dynamically updated according to user responses.

As another potential benefit, the system and method can track a spectrum of different types of responses. Preferably, the system and method can detect various forms of positive responses, negative responses, and neutral responses. The system and method is preferably not limited to only the positive response of purchasing a product. Pickups, setbacks, placed in carts, attention, lack of attention, and/or other suitable signals may tracked, characterized and/or otherwise monitored. Furthermore, the system and method may additionally be configured to track a custom condition. For example, one marketing campaign may care about metrics related to a response condition based around a customer reading long form content on the packaging. Accordingly, the system and method could be configured to detect from the collected image data when a customer is detected to have directed their attention to the region of long-form marketing content for some duration of time thereby indicating engagement with the long-form content.

As another related benefit, the system and method includes features to improve operation of an implementing system by selectively setting image processing pipeline based on requirements. Different products may have different forms of monitoring, and therefore image data processing can be customized. This can have physical implications into the computational operation of such a computing system as it may enable more efficient use of computer resources. This may include, for example, detecting an item instance associated with a product identifier, determining the marketing analytic configuration for that item, and implementing an associated form of image processing for related image data. For example, one product may be configured for tracking instances of user attention and so image processing for image data showing people within some distance threshold can be processed for direction of attention; a second product may be configured for tracking purchase decisions broken down by age such that detecting product selection triggers age classification of the associated user; and a third product may have no configured analysis and may not trigger additional analysis.

As another potential benefit, the system and method can be used in optimizing or improving store operations. The system and method can be used in generating updated planograms that respond to actual activity in the environment. In this way, the system and method may be used to generate highly tuned planograms, which can result in better efficiency for a store and better shopping experiences for customers.

As another potential benefit, the system and method can simplify the logistics of tracking fine packaging and marketing variations, which may have been traditionally too operationally complex to track. The system and method enable a way for random or pseudo random distribution of product variations to be monitored and tracked for customer responses. Those responses can then be analyzed across multiple different user responses and across different users, store locations, or other segments.

2. System

As shown in FIG. 1, a system for dynamic product marketing through computer vision can include a computer vision (CV) monitoring system 110, an item registration system 120, a response classifier 130, an analytics system 140, and optionally a design system 150.

The system is preferably at least partially installed within a retail environment. For example, at least the imaging devices of the CV monitoring system 110 are installed within the retail environment. The item registration system 120, response classifier 130, analytics system 140 and/or other components are preferably implemented within a computing system that can be locally hosted and/or remotely hosted over a network. Herein, a computing system can include one or more computer-readable mediums (e.g., a non-transitory computer-readable medium) that include a set of instructions that cause one or more computer processors to perform a process such as described in the method herein or a portion of the process.

More preferably, the system is implemented across multiple sites such that data can be collected and analyzed across multiple retail environments. For example, the system can be installed across multiple grocery stores such that an understanding of product.

In one preferred implementation, the system is implemented as part of a multitenant computing platform that includes an account system. In a multitenant computing platform implementation, multiple different entities may each individually use the product marketing features of the system and method in their own customized manner. The entities can access the computing platform through an account and interact with the platform in a manner allowed by the permissions assigned to the account.

A CV monitoring system 110 of a preferred embodiment functions to transform image data collected within the environment into observations relating in some way to items in the environment. Preferably, the CV monitoring system no is used for detecting items, monitoring users, tracking user-item interactions, and/or making other conclusions based on image and/or sensor data. The CV monitoring system 110 will preferably include various computing elements used in processing image data collected by an imaging system. In particular, the CV monitoring system no will preferably include an imaging system and a set of modeling processes and/or other processes to facilitate analysis of user actions, item state, and/or other properties of the environment.

The CV monitoring system no is preferably configured to facilitate identifying of items and detection of interactions associated with identified items. The CV monitoring system 110 can additionally detect various contextual marketing conditions that can be used in defining different product presentation variations.

In some variations, the CV monitoring system 110 can be used for detecting and determining different product presentation variations. In other words, the CV monitoring system no could dynamically determine different marketing scenarios for a particular product using image data analysis.

In a preferred variation, the CV monitoring system will at least detect instances of different product presentation variations (whether those variations are pre-specified or dynamically detected). Furthermore, the CV monitoring system 110 is used in detecting interactions between one or more users and an item. The items are preferably associated with one or more product presentation variations.

The CV monitoring system no preferably provides specific functionality that may be varied and customized for a variety of applications. In addition to item identification, the CV monitoring system no may additionally facilitate operations related to person identification, virtual cart generation, item interaction tracking, store mapping, and/or other CV-based observations. Preferably, the CV monitoring system no can at least partially provide: person detection; person identification; person tracking; object detection; object classification; object tracking; gesture, event, or interaction detection; detection of a set of customer-item interactions, and/or other forms of information.

In one preferred embodiment, the system can use a CV monitoring system 110 and processing system such as the one described in U.S. Patent Publication No. 2017/0323376 filed on May 9, 2017, which is hereby incorporated in its entirety by this reference. The CV monitoring system no will preferably include various computing elements used in processing image data collected by an imaging system.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable items. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers).

The imaging system preferably includes a set of static image devices mounted with an aerial view from the ceiling or overhead. The aerial view imaging devices preferably provide image data that observes at least the users in locations where they would interact with items. Preferably, the image data includes images of the items and users (e.g., customers or workers). While the system (and method) are described herein as they would be used to perform CV as it relates to a particular item and/or user, the system and method can preferably perform such functionality in parallel across multiple users and multiple locations in the environment. Therefore, the image data may collect image data that captures multiple items with simultaneous overlapping events. The imaging system is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system 110 may have an imaging system with only partial coverage within the environment.

In some variations, the imaging system may be used for only a particular region in the environment. For example, if a limited set of products is subject to product marketing analysis, the imaging system may include imaging devices that are oriented with fields of view covering the set of products. For example, one implementation of the system may include a single camera mounted so that the field of view of the camera captures the shelf space and surrounding area of one type of cereal.

A CV-based processing engine and data pipeline preferably manages the collected image data and facilitates processing of the image data to establish various conclusions. The various CV-based processing modules are preferably used in detecting products, detecting product presentation variations, generating user-item interaction events, capturing a recorded history of user actions and behavior, and/or collecting other information within the environment. The data processing engine can reside local to the imaging system or capture devices and/or an environment. The data processing engine may alternatively operate remotely in part or whole in a cloud-based computing platform.

The CV-based processing engine may use a variety of techniques. In some instances one or more CV models may be used to process image data to yield a characterizing result which could be an identifier, classification, imaged mask, and the like. At least for different models used for classification, detection and/or identification, a CV model may apply classification technique such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes.

The item detection module of a preferred embodiment, functions to detect and apply an identifier to an object. The item detection module preferably performs a combination of object detection, segmentation, classification, and/or identification. This is preferably used in identifying products or items displayed in a store. Preferably, a product can be classified and associated with a product identifier such as a Stock Keeping Unit (SKU) identifier, a Universal Product Code (UPC), or other suitable type of product identifier. In some cases, a product may be classified as a general type of product. For example, a carton of milk may be labeled as milk without specifically identifying the SKU of that particular carton of milk. An object tracking module could similarly be used to track items through the store.

As described below, the item detection module may additionally be used to detect product packaging and presentation variations. In one implementation, the item detection module may be preconfigured to detect product packaging variations as distinct items, which are then modeled as being product variations. In another implementation, the item detection module or a related system can facilitate detecting a product identifier of an item and then classifying the item as a product packaging variation. Other suitable classifier or processing modules may additionally be used such as image data comparison/matching, text extraction, and the like.

In a successfully trained scenario, the item detection module properly identifies a product observed in the image data as being associated with a particular product identifier. In that case, the CV monitoring system 110 and/or other system elements can proceed with normal processing of the item information. In an unsuccessful scenario (i.e., an exception scenario), the item detection module fails to fully identify a product observed in the image data. An exception may be caused by an inability to identify an object, but could also be other scenarios such as identifying at least two potential identifiers for an item with sufficiently close accuracy, identifying an item with a confidence below a certain threshold, and/or any suitable condition whereby a remote item labeling task could be beneficial. In this case the relevant image data is preferably marked for labeling and/or transferred a product mapping tool for human assisted identification.

The item detection module in some variations may be integrated into a real-time inventory system. The real-time inventory system functions to detect or establish the location of inventory/products in the environment. The real-time inventory system can manage data relating to higher level inventory states within the environment. For example, the inventory system can manage a location/position item map, which could be in the form of a planogram. The inventory system can preferably be queried to collect contextual information of an unidentified item such as nearby items, historical records of items previously in that location, and/or other information. Additionally, the inventory system can manage inventory data across multiple environments, which can be used to provide additional insights into an item. For example, the items nearby and/or adjacent to an unidentified item may be used in automatically selecting a shortened list of items used within the product mapping tool.

User-item interaction processing modules function to detect or classify scenarios of users interacting with an item (or performing some gesture interaction in general). User-item interaction processing modules may be configured to detect particular interactions through other processing modules. For example, tracking the relative position of a user and item can be used to trigger events when a user is in proximity to an item but then starts to move away. Specialized user-item interaction processing modules may classify particular interactions such as detecting item grabbing or detecting item placement in a cart. User-item interaction detection may be used as one potential trigger for an item detection module.

A person detection and/or tracking module functions to detect people and track them through the environment.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages).

A gesture, event, or interaction detection modules function to detect various scenarios involving a customer. One preferred type of interaction detection could be a customer attention tracking module that functions to detect and interpret customer attention. This is preferably used to detect if, and optionally where, a customer directs attention. This can be used to detect if a customer glanced in the direction of an item or even if the item was specifically viewed. A location property that identifies a focus, point, or region of the interaction may be associated with a gesture or interaction. The location property is preferably 3D or shelf location "receiving" the interaction. An environment location property on the other hand may identify the position in the environment where a user or agent performed the gesture or interaction.

Alternative forms of CV-based processing modules may additionally be used such as customer sentiment analysis, clothing analysis, customer grouping detection (e.g., detecting families, couples, friends or other groups of customers that are visiting the store as a group), and/or the like. The system may include a number of subsystems that provide higher-level analysis of the image data and/or provide other environmental information such as a real-time virtual cart system.

The real-time virtual cart system functions to model the items currently selected for purchase by a customer. The real-time virtual cart system may additionally be used in defining various user-item interactions such as selecting an item for purchase, purchasing an item, deselecting an item for purchase, and/or other purchase-related events. The virtual cart system may additionally enable automatic self-checkout or accelerated checkout. Product transactions could even be reduced to per-item transactions (purchases or returns based on the selection or de-selection of an item for purchase). The virtual cart system may be integrated with the system to provide purchase or planned purchase information, which may be used as a condition for delivering content. The type of content delivered to customer may be based in part on their current cart contents. For example, a coupon may be selected and delivered to a customer for a particular brand of ketchup buns based in part on the customer having hamburger buns and ground beef in the cart.

As discussed, the image processing pipeline may be customized to a particular item instance or a set of image data. For example, the processing of image data from one camera may be dependent on the detected products in the field of view of that camera. Accordingly, a process for setting the processing pipeline may include detecting an item, querying a database of analysis configuration to determine the analysis configuration for the identifier of the item, and implementing analysis of the image data according to the analysis configuration.

An item registration system 120 functions to identify and note a product presentation variation. A product presentation variation represents one marketing effort related to a product. The item registration system 120 is preferably a component that manages tracking of the various ways in which an item is marketed. The item registration system 120 can preferably detect and register an item for monitoring based on packaging variations, but may additionally or alternatively track marketing factors such as product placement/layout (e.g., front-facing, edge-facing, stacked, special arrangements, endcap placement, etc.), nearby promotional signage_(e.g., banners or coupons), and/or other marketing-based product presentation factors. The item registration system 120 may be part of the item detection module. The item registration system 120 may alternatively operate in coordination with the item detection module and/or any suitable systems.

The item registration system 120 preferably includes a computer system configured to detect product presentation variation and associate the product presentation variation with a detected item instance. The item registration system 120 can include database that maps detected item instances (e.g., CV detected item instances) and their related product presentation variations.

Figure 2:
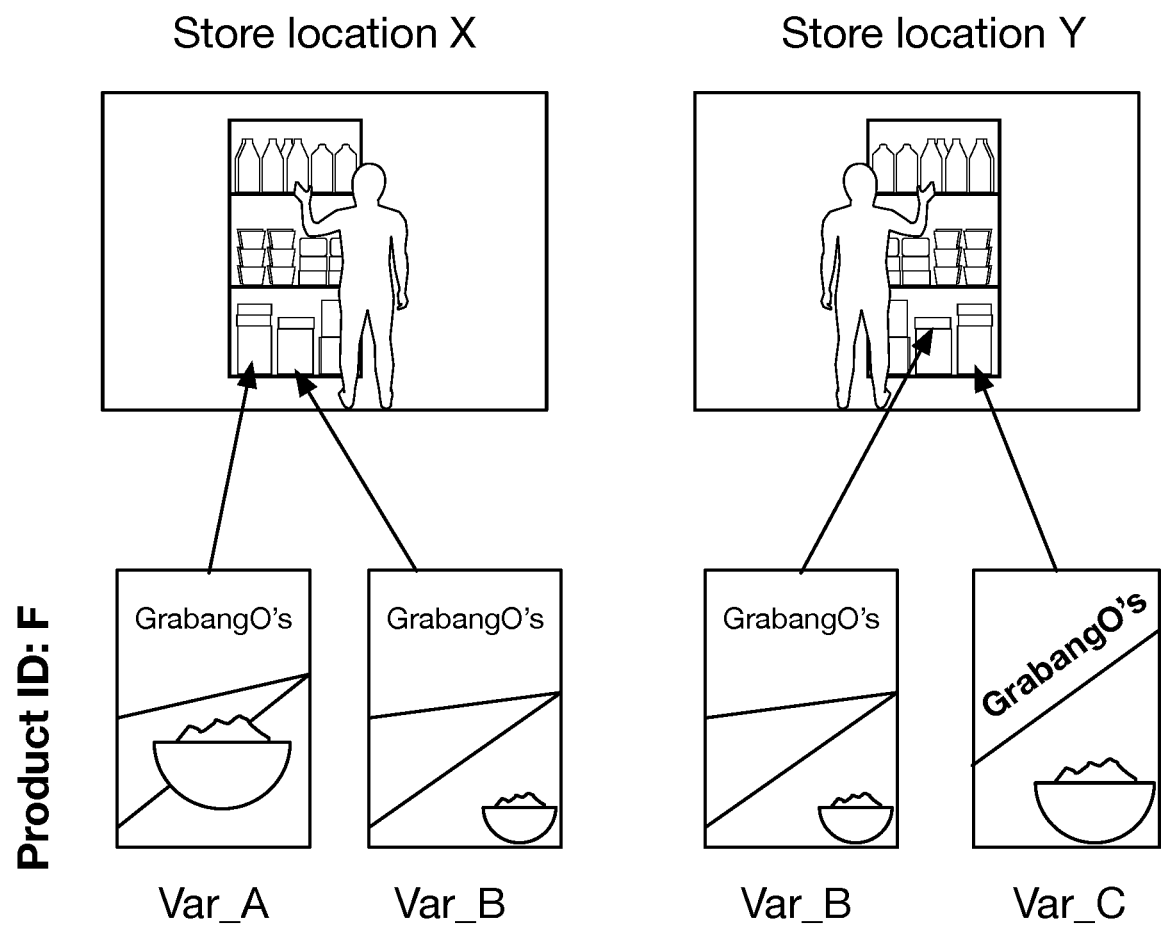
FIG. 2 is a schematic representation of product packaging variations detected by an item registration system.

In one preferred variation, the item registration system 120 will track the different products and their packaging variations as shown in FIG. 2. This preferably tracks the visual packaging variations of a SKU item (stock keeping unit) or product identifier. Different packaging variations may be used for a particular SKU item. For example, a box of cereal may be sold with a graphical banner highlighting a nutritional fact on the box and without such a graphical banner. Each of these product variations may be tracked.

In one preferred variation, the item registration system 120 includes computer vision classification processing modules that facilitate automatically detecting product presentation variations. A variation of the item registration system 120 with automatic registration, can preferably detect known and new product variations (based on packaging) in the image data collected from an environment. The items detected through the CV monitoring system no will preferably be identified by a product identifier and a packaging variation identifier. A machine learning or artificial intelligence model could be trained in detecting and classifying items by product identifiers (e.g., SKU identifiers). The ML/AI model can preferably be applied in detecting different packaging variations and their grouping as the same product. Detection of a packaging variation is preferably used in registering that variation as a product presentation variation. In one example, a data processing pipeline of the item registration system 120 will use a trained image classifier model to classify items in the image data by a product identifier. Then, for a set of items with the same classification, a second processing stage can segment the items by packaging variations and/or other forms of product presentation variations. Such a data processing pipeline will preferably include a model of product packaging such that the different sides of a box or the container may be modeled as different views of the product.

Classification of item-related image data into different product presentation variations can be performed regardless of how the product identifier is assigned to an item instance. In some cases, a planogram or another form of item-location map may be used in specifying the product identifier for items in a region of the image data. For a given region associated with a product identifier, the item registration system 120 can segment and/or classify the types of product presentation variations present. In some cases, there may be multiple different product presentation variations and in other cases there may be only a single product presentation variation with a store a given time.

In another variation, the item registration system 120 can include a registration interface, which functions to enable receiving input from an outside entity on product variations. The registration interface is preferably a user interface of a user application. In one example, a product manufacturer, distributer, store operator, and/or any suitable entity may manually register new product variations. This may include supplying sample images of the product variation. In some cases, this may include uploading training data for training of a ML/AI based CV model.

The item registration system 120 may additionally be used in grouping related products and/or variations. In some cases, someone may be interested in the performance of a group of related items. Tags, classifiers, collections/groups, and/or other data labeling tools can be used in orchestrating how the system should track different items.

Additionally or alternatively, the item registration system 120 may additionally detect or otherwise track external marketing context around a particular item. As with packaging detection, the item registration system 120 may use automatic detection through CV processing of image data when detecting external marketing context variations. For example, signage, store placement and arrangement, and/or other marketing factors may be automatically detected in the image data and associated with nearby and/or relevant products. Additionally or alternatively, an external interface may be used for pre-configuring products or regions of the environment with marketing context variations. For example, a store operator may add different marketing efforts and associate those with products.

In another variation, the item registration system 120 is configured to detect a set of presentation variation graphical identifiers. A graphical identifier such as a QR code, barcode, or other suitable type of visual marker can be visually present on the packaging of the product or in proximity to the product such as on a promotional banner. This machine readable identifier can be detected by processing of the image data and used to identifying a particular marketing scenario.

A response classifier 130 functions to track user-item interactions or more specifically customer-product interactions. The response classifier 130 may operate in coordination with or as part of the user-item interaction processing module of the CV monitoring system 110 above. The response classifier 130 preferably tracks user-item interactions and associates those items with one or more items. In some variations, tracking a user-item interaction may evaluate some condition over a number of detected user-item interactions. The response classifiers 130 may be pre-configured and fixed. Alternatively, the response classifiers 130 may be customized for different products, brands, campaigns, experiments, or any suitable grouping.

The response classifiers 130 may include classifiers and image analysis modules such as an item selection module, item attention module, item put-back module, item try-on detection module, and/or other suitable types of classifiers.

An item selection module can detect item pickup events. Implementation and approach may be performed in a variety of ways as described above for detecting user-item interactions.

An item attention module can detect instances of a user directing attention at the item or at least in the vicinity of the item. In one exemplary implementation, the response classifier performs biomechanical or pose estimation of a detected user, and detects user attention in the direction of the product. There may be a time threshold for the minimum window of time where attention is directed at an item before it counts as. Alternatively, rather than counting discrete classifications of classification (e.g., no attention, sustained attention of 1 second, sustained attention over 1 second, etc.), the item attention module may maintain a metric of the duration of attention, which may be broken down by person or overall.

Item put-back module can detect when an item was placed back after an item selection event. This module functions to determine when an item was picked-up but then ultimately not purchased. A put-back may happen at a different location within an environment, though some variations may be limited to only detecting a put-back at or near the original item placement or within monitored regions of a retail environment.

An item try-on module functions as a module customized to a particular type of product. In the case of an apparel situation, the response classifier 130 can analyze the image data to determine if a user tried on an item. This may detect the active wearing of an item. For example, detecting a user putting a hat on their head. Alternatively, the item try-on module may detect when an item is taken into a try-on region of the environment. Similar alternative response classifiers may be used for specific products where a type of interaction is of interest. For example, a modified user-item interaction classifier can be used for perfume or lotion to detect when a user applies interacts with a sample.

An analytics system 140 functions to generate a report based on response classifications for different product variations, user variations, and/or environment variations. Preferably, a set of different metrics, charts, and/or graphics can be generated and used to communicate performance comparisons of how product presentation variations impacts customer responses. In one variation, such analytics can be communicated through an interface, which could include a graphical user interface or a programmatic interface (e.g., an application programming interface (API)). In another variation, data output from the analytics system 140 may be communicated to a second connected digital system such as a design system 150 or a third-party computer system.

In one variation, the system may include a design system 150, which functions to integrate product marketing insights into control inputs for various design systems 150. The design system 150 can include graphical design systems 150, product or packaging production systems, shipping and logistics systems, and/or any suitable system. The system may additionally integrate with other marketing-related systems such as retail advertisement or promotions marketplace.

In one variation, integration with a graphical design application for product packaging may enable different elements to be defined as variables and allow the system to automate the manipulation of the variables. In one instance, the color background of a boxed good may be algorithmically manipulated over many production batches such that A/B styled testing can be used to optimize color selection for a desired result.

In another variation, integration with a shipping and logistics system can alter the shipment of different product packaging such that it is sent to appropriate store locations either for the purpose of testing response or as a result of marketing analytics generated by the system.

The system may additionally include a campaign management portal, which functions as a user interface for one or more users to review and configure use of the system. In one implementation, the system can support multiple accounts. Accordingly, a user can log-in to the account and then access their campaign management portal to set and configure different aspects. The campaign management portal may be part of a user interface that also works in connection with a user interface of the item registration system 120 and the analytics system 140.

The systems, sub-systems, modules, services, and/or other system components described herein (e.g., the CV monitoring system 110, item registration system 120, response classifier 130, analytics system 140, design system 150, etc.) are preferably computer-implemented systems or other suitable circuitry operated systems that are implemented through a computer-processor and configured through machine instructions to implement processes described herein. Accordingly, the CV monitoring system 110, item registration system 120, response classifier 130, analytics system 140, and design system 150 may alternatively be referred to as CV monitoring circuitry, item registration circuitry, response classifier 130 circuitry, analytics circuitry, and design system 150 circuitry. The components of the system may individually or in any suitable combination include one or more machine-readable medium (e.g., a non-transitory machine readable medium) and one or more processors, wherein the machine-readable medium includes computer-executable instructions that when executed by the one or more processors cause the processes of collecting image data, registering and identifying a set of product presentation variations, detecting user-item interactions associated with the set of product presentation variations, analyzing user-item interactions across the set of product presentation variations, and/or generating marketing instructions.

3. Method

Figure 3:
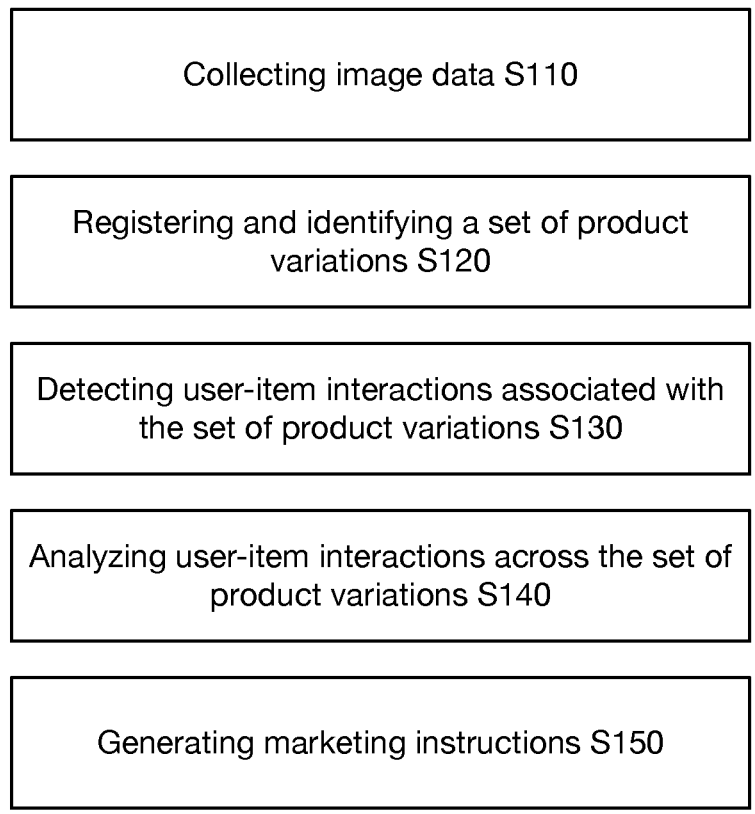
FIG. 3 is a flowchart representation of a method of one embodiment.

As shown in FIG. 3, a method for dynamic product marketing through computer vision comprises collecting image data S110, registering and identifying a set of product presentation variations S120, detecting user-item interactions associated with the set of product presentation variations S130, analyzing user-item interactions across the set of product presentation variations S140. The method may additionally include generating marketing instructions S150. Different presentation variations may relate to explicit marketing options such as packaging, special display configurations, and signage. Presentation variations may additionally or alternatively include other factors that impact the presentation of a product such as tidiness of facing or alignment on a shelf.

The method is preferably implemented by a system substantially similar to the one described above, but the method may alternatively be implemented by any suitable system.

Figure 4:
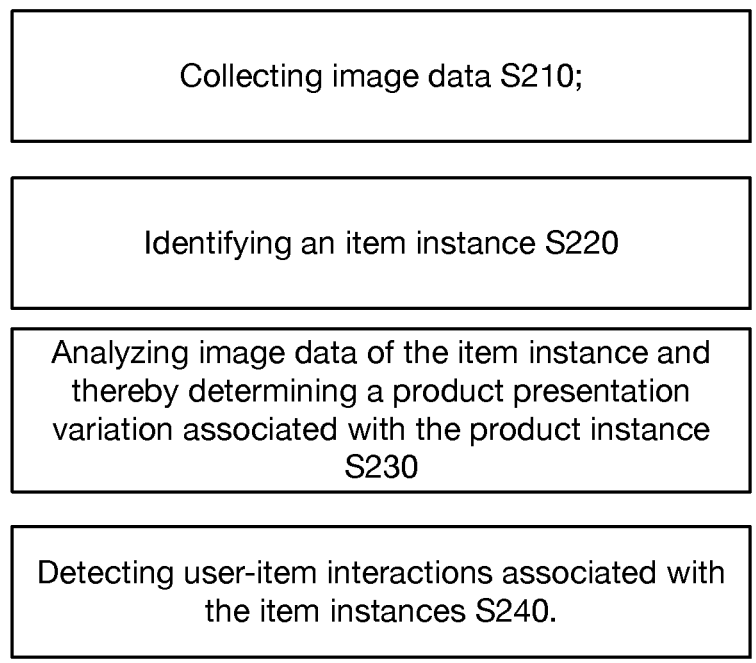

The method preferably incorporates a process of determining a presentation variation or otherwise characterizing/modeling the marketing of a product. As shown in FIG. 4, a method for characterizing marketing of a product instance can include collecting image data S210; identifying an item instance S220; analyzing image data of the item instance and thereby determining a product presentation variation associated with the product instance S230; and detecting user-item interactions associated with the item instances S240.

This process of determining a presentation variation is then implemented iteratively in execution of the method as described above. As shown in FIG. 5, a variation of the method may be more described as including collecting image data S310; identifying item instances within the environment S320; for each item instance of the set of item instances, analyzing image data of an item instance and thereby determining a product presentation variation associated with the item instance S330; detecting user-item interactions associated with the item instances S340; and analyzing user-item interactions associated with the set of item instances according to the product presentation variations S350. In this variation, block S110 and its variations can correspond to block S310; block S120 and its variations can correspond to blocks S320 and S330; block S130 and its variations can correspond to S340; and block S140 and its variations can correspond to S350.

A first exemplary variation, method may use supplied information on the possible product presentation variations. For example, a set of possible product packaging options and/or current signage options can be specified within the system. The method can facilitate automated detection and tracing of user responses to these various forms of presentations.

As another exemplary variation, the method may dynamically detect and group a product in a store with a product presentation variation. In such an example, the method may need no prior knowledge on different marketing efforts. For example, different product packages and promotional signs may be detected as new variations and tracked as such.

In some variations, associations with a product presentation variation may be performed more as a tagging system where a product instance may be associated with multiple different presentation variations. For example, a given product instance may have a marketing/presentation related properties such as product arrangement, packaging variation, nearby marketing items (e.g., signs, coupons, etc.), and the like tracked for a given product instance.

The method may be customized to a variety of situations and applications. Different variations may detect different types of product presentation variations. Different variations of the method may also detect different types of user-item interactions. Furthermore, different variations of the method may be applied and used for generating different results and/or directing different interactions.

In some instances, such customization can be specified and set according individual customization. A method implemented in connection with a multi-tenant computing platform may have individually configured processes implemented for different products or items.

Block S110, which includes collecting image data, functions to collect video, pictures, or other imagery of an environment. The image data is preferably captured over a region expected to contain objects of interest (e.g., inventory items) and interactions with such objects. Image data is preferably collected from across the environment from a set of multiple imaging devices. Preferably, collecting imaging data occurs from a variety of capture points. The set of capture points include overlapping and/or non-overlapping views of monitored regions in an environment. The imaging data can substantially cover a continuous region. However, the method can accommodate for holes, gaps, or uninspected regions. In particular, the method may be robust for handling areas with an absence of image-based surveillance such as bathrooms, hallways, and the like. Alternatively, the method may utilize a single imaging device, where the imaging device has sufficient view of a relevant region in the environment.

The imaging data may be directly collected, and may be communicated to an appropriate processing system. The imaging data may be of a single format, but the imaging data may alternatively include a set of different imaging data formats. The imaging data can include high resolution video, low resolution video, photographs from distinct points in time, imaging data from a fixed point of view, imaging data from an actuating camera, visual spectrum imaging data, infrared imaging data, 3D depth sensing imaging data, parallax, lidar, radar, sonar, passive illumination, active illumination, and/or any suitable type of imaging data.

The method may be used with a variety of imaging systems, collecting imaging data may additionally include collecting imaging data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

Block S120, which includes registering and identifying a set of product presentation variations, functions to configure a set of product presentation variations and then detect presence of instances of such product presentation variations in the image data.

Block S120 is more specifically implemented as registering a set of product presentation variations S122 and identifying item instances of the set of product presentation variations S124. Process S120 may be implemented in variations where the product presentation variation is pre-configured or where product presentation variations are automatically and dynamically registered.

Registering and identifying a set of product presentation variations in one preferred variation includes registering and identifying a set of product packaging variations, which functions to differentiate between visually different product packaging. Product packaging variations can preferably be detected and then item instances corresponding to those product packaging variations can be tracked for associated user-item interactions. In one variation, product packaging variations may be pre-configured where the CV monitoring system receives prior data that is used in directing how items are detected, classified, and/or segmented as different product packaging variations. In another variation, product packaging variations may be dynamically recognized and used to automatically detect product packaging variations.

In a pre-configured variation, block S120 can be implemented by initially registering a set of product presentation variations and then identifying product instances from the set of product presentation variations in the image data. This variation preferably uses pre-configuration of the product presentation variations from one or more sources.

In a manual configuration variation, initially registering a set of product presentation variations may be performed through manual configuration of a set of product presentation variations. Configuring may be performed through a user interface. Configuring each product presentation variation can include receiving a product presentation variation description (e.g., name, description, etc.) and/or packaging image data. The packaging image data may be samples of the actual packaging graphics. For example, the source image file used in producing the packaging may be uploaded to the system. The packaging image data may alternatively be a collection of real-world pictures or media captures of the product presentation variation. For example, a photo or collection of photos of one or more product packaging variations can be uploaded. The packaging image data is preferably labeled with an identifier of the product packaging variations.

As an example, a product manufacturer may want to understand the impact of three different packaging variations. The product manufacturer can upload the packaging graphics used in the packaging of each product presentation variation. As an additional or alternative variation, registering a set of product presentation variations may include receiving product packaging variations from a design application. For example, a graphics program, a packaging asset management software system, a packaging production system, and/or other suitable computer operated system may communicate packaging data to a response classifier system which can then be used in constructing or otherwise defining product packaging variations.

The configuration of the product presentation variations will setup the CV monitoring system for the identifying of the product presentation variations in the image data and classification of identified items as one of the product presentation variation.

In terms of identifying item instances from the set of product presentation variations in the image data, the method may include using the received packaging image data in generating a classifier model and processing collected image data with the classifier model trained with the packaging image data thereby detecting item instances corresponding to a particular product packaging variation. A packaging classifier model may be trained on a large number of packaging variations for different products in the store.

In an alternative approach, block S120 can include applying one or more process for identifying a product instance in the image data as an instance of a type of product (i.e., identifying the product instance with a product identifier) and then classifying and labeling the product instance (once identified) according to a product presentation variation. Since the product type is determined initially, differentiating between product presentation variations may be more easily performed.

The approach to detecting a product instance can use CV detection, receiving image data labeling, applying a product map to the image data, and/or other techniques. In a CV detection variation, an item may be associated with a particular product identifier (e.g., a SKU identifier) applying a product identifier model to the image data to detect item instances of a product or detect regions in the image data where a product is located. In a labeling variation, human labelers may tag or apply a label to the image data, which is used in associating a particular item or image data region with a product identifier. In a product map variation, detecting a product instance uses a planogram or other type of product map that associates a product identifier with a location in the store. The product map may be used to associate image data of an item on a shelf or otherwise displayed in the store with a particular product identifier.

In an alternative labeled variation, image data may be manually labeled so that a product identifier as assigned to a detected item or to a region within the image data.

Various approaches may be used in determining a product packaging variation (and/or other suitable type of product presentation variation).

In one variation of determining a product packaging variation, a product-specific packaging classification model can be trained so as to classify image data by different product packaging variations. The method accordingly could include training a product-specific packaging classification model for a set of products (as indicated by a product identifier); after identifying an item instance as a product identifier, selecting the product-specific packaging classification model; and applying the selected product-specific packaging classification model to image data of the item instance. For example, if a box of cereal has five different packaging variations, image data of the cereal can then be classified as belonging to one of those fiver packaging variations (or possibly as none of them there is not a satisfactory match to one of them).

In another variation of determining a product packaging variation, image data of an identified item instance can be compared to image data of the packaging variations to determine the closest match. The method accordingly could include comparing the image data of an identified item instance with image data of a set of packaging variations, determining a select product variation with a highest correspondence/match score, and associating the select packaging variation with the item instance. The image data of the packaging can be normalized in size, color, and/or in otherways prior to comparison. The comparison could be a pixel differentiation process. The comparison may alternatively use an image fingerprinting algorithm, which could look at various features of the image. A high correspondence score preferably indicates a close match.

Other alternative variations may also be used depending on the changes in product packaging or other presentation variations. For example, color changes could be tracked using image histograms; text content changes could be tracked using optical character recognition and comparison of text on the packaging; and/or other visual packaging comparisons may be used.

In a dynamic registration variation, block S120 can be implemented by identifying product instances in the image data and registering product presentation variations from the identified product instances. This variation functions to provide ad-hoc and dynamic registration of product presentation variations in response to identified product items. In contrast to the preconfigured variation discussed above, this variation may not depend on previous specification or prior indication of product presentation/packing variations, and instead, product presentation variations are dynamically determined and classified across similar item instances.

In a dynamic registration variation, product instances are initially identified through the CV monitoring systems processing of the image data or through one of the approaches of using a product map, labeled image data, and/or other suitable product identification approaches. As a result of the item identification process (i.e., product detection), items can be recognized as products associated with defined product identifiers (e.g., a SKU number, UPC, or a comparable identifier). Identification of a product is preferably performed with a model covering a number of product packaging variations such that the CV model is resilient to newly introduced product presentation variations. Furthermore, the product identification can be updated to accommodate new product packaging variations. Upon detecting a product instance, block S120 proceeds to a product presentation registration process. The product presentation registration process functions to classify or label a product instance with a presentation variation label. A product presentation registration process may use an AI/ML model, use image comparison approach, comparison of specific attributes such as color histograms or text content, and/or other suitable techniques. These approaches may be similar to determining a presentation approach in the preconfigured variation, but this variation may support the dynamic determination and differentiation between different variations.

In a CV registration process, block S120 can include applying a product registration AI/ML model thereby segmenting and classifying instances of type of product based on variations of the product packaging. The product registration model can map image data of a product instance to a vector space that can then be segmented into different packaging variations based on grouping of the mapping of different product instances. For example, a set of product instances of a type of cereal may be segmented into three different groups based on the different images printed on the front of the box. When a new box design is released, this new design would preferably be identified as that product identifier using a first product detection model but classified as a new product packaging variation using a second classifier model.

In some implementations, the method may include a combination of dynamic registration and pre-configured variations where a portion of product presentation variations are pre-configured and others are dynamically registered. For example, one implementation may initially try to identify product packaging variation using pre-existing product packaging variation data. Upon detecting an item instance does not match an existing product packaging variation, then dynamic registration may be performed in case a new product package has been introduced. Once a new product packaging variation is determined it may be added to the database of pre-existing product packaging variations such that future occurrences can be detected.

In addition to or as an alternative to product packaging variations, registering and identifying a set of product presentation variations may include registering and identifying a set of product related promotional variations, display variation, and/or environmental variations. Such contextual variations may provide contextual product presentation variation information that is not directly apparent on the physical product but related to how the product is sold at the time of a user-item interaction. Registering and identifying contextual product presentation variations can be used to interpret the impact of: products position or arrangement on shelves; sales tactics like special product displays; sales, coupons, promotions, sales; in-store messaging; and/or other factors.

In one variation, registering and identifying contextual product presentation variations preferably includes detecting an item instance within the image data; detecting an instance of a contextual presentation variation with some proximity to the item instance and associating the contextual presentation variation with the item instance. This variation detects a second visually present object that relates to the marketing of the product.

In one example, a sign, banner, poster, and/or other type of signage can be detected. Other alternative detectable marketing signage can include coupons or sale/promotional labels. This signage can be analyzed and associated with a particular variation. Signage variations may use different textual copy, colors, graphics, signage type as shown in FIG. 3. In addition to the type of sign, S120 may additionally include characterizing relative positioning of the signage and the item instance. Characterizing relative positioning can include estimating displacement, determining relative positioning directions (e.g., above, below, to the right, to the left, etc.).

In another variation, registering and identifying contextual product presentation variations can include detecting an item instance within the image data; and analyzing the display presentation of the item instance and classifying the display representation. Classifying the display representation may assign display option tags or classifiers such as "front facing", "side facing", "horizontally arranged", "vertically arranged", a shelf level number, aisle number, and other labels. Additional display metrics may be detected and stored as properties of the product presentation. Display metrics could include a tidiness metric that is a measure of the alignment of items on a shelf. For example, product box displayed at an off-angle will have a tidiness score associated with poor tidiness while a product box with a face aligned to the edge of the shelf will have a tidiness score associated with good tidiness. Display metrics could include a shelf space measurement metric that measures the shelf space (e.g., continuous shelfspace) for displaying an item instance.

Some types of products may have other in-store marketing conditions tracked as part of the presentation properties for a particular product.

In a clothing retail environment, the display models of pieces of apparel can be tracked as forms of marketing variations. Accordingly, block S120 can include detecting related modeled displays of a product. In this case, there are two distinct detections of an item—the item instance to be sold and a modeled instance of the same product. The modeled instance can be the same exact product or a related model such as a different color, size, pattern, or other variation. As one example, the method may detect the display of a shirt in a blue color and associate that marketing with the other color variations of the product. For example the method could enable tracking of how the displaying of one color impacts the try-ons and/or sales of that specific colored product and the other color/pattern variations of the product.

In a skincare beauty product retail environment or another retail environment where there are product samples, block S120 may include detecting an associated product sample display. Furthermore, the method may include detecting use of the product sample display. For example, as part of detecting a product presentation variation, the method may detect a user trying a perfume sample and associate that with user-item interactions with a product instance stored on a shelf.

In one variation, contextual product presentation variations will preferably include marketing conditions that relate directly to a product. Contextual product presentation variations may additionally or alternatively register conditions not directly associated with the product but based on presence in the environment, in near proximity to a product, and/or another relationship to the product. For example, the promotion of an alternative brand of a type of product may be noted as a marketing variation for a product X. In this way, the producer of product X can review the impact of competitor promotions on sales. Specific data related to the competitor and the associated user-item interactions will generally scoped to only be shared with the appropriate entities.

Preferably, product packaging variations and some type of contextual product variations can be tracked in combination. In a similar manner to product packaging variations, other types of product variations can be pre-configured or dynamically detected through CV monitoring.

Block S130, which includes tracking user-item interactions associated with the set of product variations, functions to detect one or more actions involving a product. Tracking user-item interactions preferably includes processing of image data with a CV model to detect the type of user-item interaction and establish an association with a particular product variation. User-item interactions can include detecting a user viewing an item, detecting a user physically interacting with the item, detecting a user performing some variation of product manipulation.

Detecting a user viewing an item may include detecting any instance of user attention directed at an item, detecting user attention directed at an item satisfying some viewing condition (e.g., a duration of time), or other suitable condition that can be classified through CV processing of the image data.

Detecting a user physically interacting with the item may include detecting the user physically touching the item or picking up the item. In a related manner, detecting a user performing a form of product manipulation may include detecting some shopping action such as selecting the item for purchase, setting the item back (e.g., "deselecting" the item for purchase), comparing product, purchasing product, exchanging the product, returning the product (e.g., returning product for refund at a customer service station), and/or any suitable type of interaction.

Detecting a user physically interacting with the item may include detecting the user performing some action with the item. As one primary example, detecting a user physically interacting with an item can include detecting a user purchasing the item, which may be performed using any suitable type of checkout process such as a traditional checkout at a point of sale (POS) station, an automated checkout, and/or other forms of purchasing. Another example specific for apparel, detecting a user performing an action with the item can be or include detecting a user trying on the item. This may be detected by detecting the user entering a try-on region of the environment while the item is in possession of the user. This may include initially detecting selection of the item by the user and then tracking the user into a try-on region (e.g., a try-on booth). Additionally or alternatively, detecting the user trying on an item can include detecting a try-on event which includes classifying the actions of a user as trying on an item. For example, detecting a user trying on a hat can be tracked as detecting a try-on event for that hat.

Preferably, multiple types of user-item interactions are tracked. The types of user-item interactions tracked may be individually configured for different product types or product variations. Some types of user-item interactions can be detected and recorded across all tracked items and recorded as an event history.

In one variation, detection of an item instance triggers registering user-item interaction processing for the image data. This can be used so that only the required forms of image processing is performed for the appropriate image data. In a retail environment there may be tens, hundreds, or even thousands of cameras. The processing of image data for each camera may be customized based on the type of user-interactions that are tracked for products within the field of view of the image data for each camera.

Additionally, the method may include detecting user properties of the associated user performing the user-item interaction. User properties may include tagging or labeling users based on user associated characteristics. Detecting user properties may include classifying a user type based on CV analysis of an environment. More specifically, this may include classifying a user by a shopping visit. A user may be classified by such visually detected aspects such as path through store, user groups (e.g., solo shopper, two-person group, adult-and-child shopping group, etc.), purchased/selected item classification, "shopper type", and/or any suitable other user classification. A shopper type may include segmenting users into some number of shopper descriptors such as a budget shopper, nutritional shopper, etc. Furthermore, the classification of a user may occur before or after a user-item interaction. For example, a user may be classified by the number of items purchased during a shopping visit, wherein the classification of the shopper happens at the end of the shopping visit. User properties may additionally include demographic properties such as age range, gender, and the like. In this way, female and male responses to different packaging variations can be detected.

Other properties can be tracked as part of user properties or in addition to user properties. For example, environment properties like geographic location, environment size, aisle information, time of day, and/or other aspects related to the store may similarly be tracked. How user-item interactions vary geographically and across different store formats can be an important detail in optimizing and targeting product marketing. Preferably, environment properties can be pre-configured for a store during setup of the system.

Block S140, which includes analyzing user-item interactions across the set of product variations, functions to process the collection of data for a set of product variations. Analyzing user-item interactions will generally include generating data sets characterizing various relationships of product variations and user-item interactions. Analyzing user-item interactions preferably prepares the collected user-item interaction data for statistical analysis based on product variations, user properties, and/or other ways of segmenting user-item interaction data. Preferably, analyzing user-item interactions will include generating comparative performance metrics that are broken down by packaging variations. Additionally or alternatively, the performance metrics can be broken down by customer properties. In one instance, analyzing user-item interactions segments user experiences by a flow of different interactions. For example, a typical user experience of finding a product, inspecting a product, selecting a product, and purchasing a product may be one such user experience flow. Alternative sequences and events such as returning or passing on a product may be other events that can be represented.

Block S150, which includes generating marketing instructions, functions to create an actionable output from operations of the CV monitoring system. In one variation, marketing instructions may be a result from transforming image data into actionable metrics around physical products in stores. Accordingly, generating marketing instructions includes generating a product marketing report. The product marketing report can be a static report on product variation performance. The product marketing report may alternatively be a dynamic and interactive user interface that can present analytics related to the collected data. In one variation, the product marketing report can indicate multivariate, multinomial or A/B testing results of different product variations. These results may be presented globally across all users, broken down by a segment of user classifications, broken down by store/environment, and/or segmented in any suitable manner.

In one variation, marketing instructions may involve integration with a product marketing system. Marketing instructions may be used in directing and setting design files or otherwise selecting a marketing asset based on results of the analysis. Accordingly, generating marketing instructions can include generating design file marketing instructions. Generating of design file marketing instructions can be applied more widely in the method in automating the creation of product packaging. For example, this variation may be used in driving performance-driven packaging of products wherein product packaging can be dynamically changed and updated so as to select for different user-item responses. Preferably, generating design file marketing instructions can set product packaging variations. This may be used so that new product packaging variations can be automatically set. For example, a color element, graphic elements, marketing copy (i.e., text), and/or other variable elements in the packaging can be altered in accordance with results of user-item interaction analysis.

System integration can be performed with digital design systems 150, product and/or packaging production systems, shipping and logistics systems, and/or any suitable system that controls defining, producing, and/or delivering marketing content. In one implementation, the method may further include configuring a set of variable elements in a digital product package design resource (e.g., a design file). A designer may set different elements of a digital design file to be variables such as a design property like a color, font/text property, graphic, and/or other properties of one or more elements in the packaging design. These elements may be augmented to "tune" marketing for various user-item response objectives. The value options may be defined to be within some range of values, to be selected from a set of options, and/or to satisfy any suitable condition. Execution of the method may then automatically set the values of these variables, which then is used in producing physical product packaging. The performance of items with those product variations can then be detected, tracked, and analyzed through the method and used in further updating the design variables.

Additionally or alternatively, marketing instructions can be used in controlling shipping and delivery of different product packaging variations. For example, the method may coordinate the shipping of different product packaging variations to different stores based on store or geographic patterns in user-item interaction responses.

Additionally or alternatively, marketing instructions may be used in at least partially self-managing advertising or promotional campaigns of a digital marketing marketplace. For example, coupons, prices, in-store signage campaigns can additionally be controlled, updated, and launched based on user-item interaction responses.

In another variation, in-store operations can be directed. For example, generating marketing instructions can include generating a planogram, wherein the planogram is a layout plan for layout of products in a store environment. Planograms may specify display location (e.g., aisle and shelf) but may additionally include specifying display arrangement (e.g., front facing, stacked vertically or horizontally) and/or any other aspects of how a product is displayed. An overall planogram may be generated. Additionally or alternatively a planogram transition report may be generated that instructs changes on an existing planogram. The planogram transition report may list items that need to be repositioned, indicating their current position and indicating the updated position. Preferably the planogram can be automatically detected using the CV monitoring system.

As discussed, there may be various implementations of the method using different approaches for detecting and tracking product presentation variations and user-item interactions with the associated products. Herein is a brief description of some preferred variations, which in no way limits the method. Any of the variations described herein may be used in any suitable combination.

The method for monitoring product marketing can include automated detection of the type of marketing for a product instance (e.g., identification or characterization of the product presentation variation of a product). Accordingly, a method for dynamic product marketing can include: collecting image data S210; identifying an item instance S220; analyzing image data of the item instance and thereby determining a product presentation variation associated with the product instance S230; and detecting user-item interactions associated with the item instances S240 as shown in FIG. 4.

This process of detecting a type of marketing for an item instance is described as being applied to one item instance, but this process may be implemented repeatedly across the environment and over time during the method. This process of detecting a type of marketing for an item instance is preferably used for multiple different product presentation variations. This process may additionally be used across different products. This can be used in creating a comparative analysis of different product presentation variations for one or more different products. Accordingly, an implementation of the method can include: collecting image data S310; identifying item instances within the environment S320; for each item instance of the set of item instances, analyzing image data of an item instance and thereby determining a product presentation variation associated with the item instance S330; detecting user-item interactions associated with the item instances S340; and analyzing user-item interactions associated with the set of item instances according to the product presentation variations S350 as shown in FIG. 5.

The reference to an item or use of an item as a descriptor may generally be more specifically referred to as a product as may be commonly the case for many applications of the method. In the below descriptions the exemplary variations will be further described as they specifically apply to products, but they may be more generally applied to any suitable type of item or object. There, when characterized as it applies to product analysis, this method may alternatively be described as:
    collecting image data;
    identifying products instances within the environment;
    for each product instance of the set of product instances, analyzing image data of an item instance and thereby determining a product presentation variation associated with the product instance;
    detecting user-item interactions associated with the product instances; and
    analyzing user-item interactions associated with the product instances according to the product presentation variations;

There may be various approaches to identifying product instance and determining/characterizing of a product presentation variation of the product instance.

As one preferred variation for identifying product instances and determining product presentation variation, the method can include identifying a product instance and using this identification (e.g., the determination of relevant product instance image data and/or identification of a product identifier) during the determination of a product presentation variation. Accordingly, identifying the set of item instances can include, for each item instance of the set of item instances, identifying the item instance with a product identifier (or other suitable type of item identifier).

The product identifier is preferably used in scoping determination of a product presentation variation and/or analysis of user-item interactions. Determining a product presentation variation may be performed within a scope of associated product identifiers.

In general, the scope of associated product identifiers can be the product instances that share the same product identifier. However, a scope of associated product identifiers may be product instances that are associated with at least one of a set of defined product identifiers. For example, the scope of associated product identifiers can include instances of a product with different size-related product identifiers, but which are analyzed as a group.

As discussed above, identifying a product identifier may be used in the analysis of user-item interactions. Analyzing user-item interactions associated with the set of product instances may be scoped within a product identifier. Accordingly, analyzing user-item interactions can include analyzing product instances with a shared product identifier and determining a select product presentation variation for the product identifier. The select product presentation variation can be the product presentation variation that is shown through analysis of the user-interactions metrics to have preferred performance over other product presentation variations. Satisfying a condition of preferred performance can depend on the user-interaction and the configured selection conditions. The selection condition may include selecting the product presentation variation that saw the most instances of a user-interaction with item instances of that product identifier. For example, this may include selecting the packaging variation of a product that was purchased more times than a second packaging variation. The selection condition may alternatively include selecting the product presentation variation that saw the fewest instances of a user-interaction with item instances of a product identifier. For example, this may include selecting the packaging variation of the product with the fewer number of item put-backs compared to a second packaging variation. Any suitable selection condition may be used which can depend on multiple user-item interactions and/or other factors.

The selection of the select product presentation variation may be used in setting and/or communicating the select product presentation variation within a connected computing system. Similarly, the analysis results may be used in any suitable way in initiating some marketing related instruction to a connected computing system.

In one variation using the select product presentation variation, the method includes updating a marketing system with the select product presentation variation. Updating the marketing system can include communicating a marketing related instruction to a connected marketing system. For example, it may include sending an application programming interface (API) request to alter configuration within the marketing system. The marketing system could be any suitable type of marketing system such as a digital display advertisement computing system, a product packaging design system, and the like. Accordingly, updating the marketing system may include setting the packaging digital asset within a digital packaging design system based on the selected product presentation variation. When the method is used for selecting a product signage, this may include setting the display signage (e.g., setting the display advertisement). Along with or as an alternative to selecting an option, this variation may include deselecting or removing one or more unselected product presentation variations for use within the marketing system.

In another variation using the select product presentation variation, the method can include updating an operations system with the select product presentation variation. More specifically this can include altering settings in the operations computing system based on the select product presentation variation.

An operations system could be a product shipping and logistics computing system. Altering settings may be used in setting store destinations based on the product presentation variation. In one implementation, the method may be used in determining which stores or the properties of stores where one product packaging performs better in sales and then the distribution of these packaging variations can be updated to go to appropriate stores. Preferably different packaging variations are shipped to different store locations depending on where they would do best.

An operations system may alternatively be an internal store operations system that defines stocking instructions. Altering settings may be used in setting shelf stocking instructions and/or updating a planogram. For example, where a product instance is stocked, how it is faced and/or arranged on a shelf may be automatically determined based on determined optimizations indicated through user-interaction analysis. As another example specific to apparel stores, the store operations system may generate a product display instructions such that displays (e.g., mannequins, front facing items, etc.) can be updated so that the display and promotion of products are updated in a data-centric manner. This may be presented as a list of changes from current status so that the changes to be made are clear. Managing such complexity could be too time consuming for human implementation. However, the method can automate and enable such targeted product distribution and/or presentation.

The determination of a product presentation variation may be performed within a defined scope of the product identifier, which can function to differentiate product presentation variations of the same product identifier or related product identifiers. These different techniques may be used in combination with various applications.

The method may include (e.g., as part of identifying an item instance and/or analyzing image data of the item instance) segmenting the product instances in the image data to yield the image data of the product instance (i.e., item/product-specific image data or more concisely item/product image data). The image data of the product instance, as discussed above, can be used in determining the product presentation variation. The segmentation of image data for product-specific image data may be performed when product packaging analysis is used, at least in part, in determining a product presentation variation of a specific product instance. Thus, the use of the segmented image data of the product instance can function to determine product presentation variations resulting from differences in product packaging or appearance. Segmenting the product instances in the image data preferably segments the image data with a bounding box, with an instance segmentation mask, and/or any suitable of selection of instance-specific image data.

Figure 6:
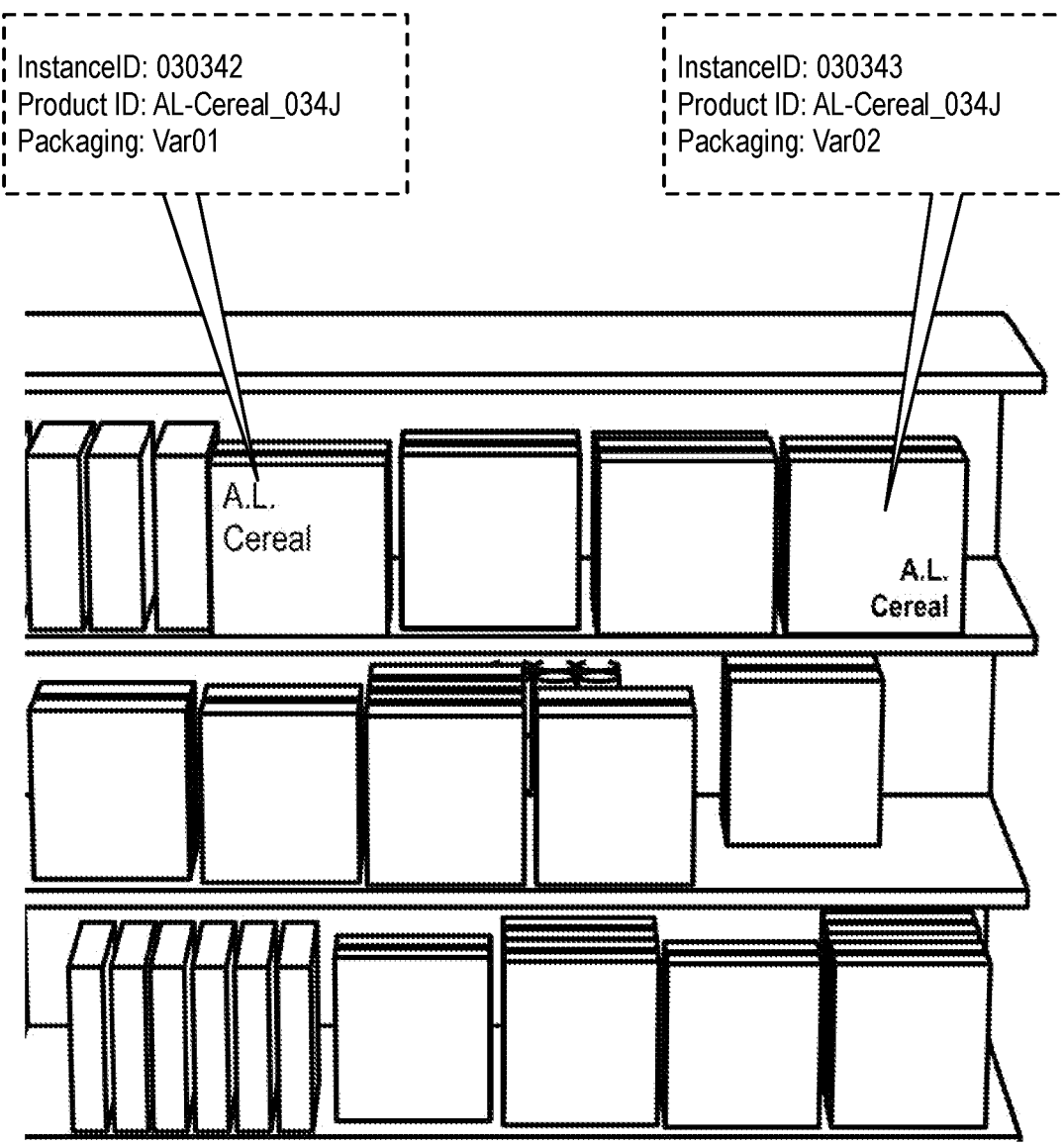
FIG. 6 is a schematic representation of determining a packaging variation of an exemplary product instance.

In one preferred variation using the segmentation variation above, analyzing image data of the product instance can further include classifying the product packaging of the product instance as a packaging variation classification using the image data of the product instance as shown in FIG. 6. In this variation, the product presentation that is determined for (and assigned to and associated with) a product instance is based, at least in part, on the packaging variation classification. In this variation, the product presentation variation can be a set of properties that includes at least a packaging variation classification property. In one implementation, a product presentation variation may be characterized through a data model of a set of different marketing/presentation related properties, one of which includes a classifier or type of identifier for the packaging used. In another variation, the product presentation variation can be the packaging variation classification. For example, the product presentation variation can be represented with an identifier of the packaging used for a given product instance.

Classifying the product packaging using the segmented product image data may be performed in a variety of ways including using a CV classification model, performing image comparison with previous product image data of the same or related product, using a text analysis, color analysis, and the like.

As one variation of classifying the packaging variation, classifying the product packaging can include applying a product packaging classification model to the image data of the product instance. A CV model can map the product image data to a vector space that characterizes the properties of the packaging variation. For example the CV model may map the product image data of a particular product instance to some vector space characterization. When performed across multiple product instances, the resulting mappings from the CV model may be classified or otherwise grouped based on shared properties.

As another variation of classifying the packaging variation can include performing product packaging comparison of the image data of the product instance and determining a product presentation variation that includes at least a packaging variation classification. Performing product packaging comparison preferably compares the product image data to previous packaging variations. If no previous packaging variations are known then that product image data may be used in characterizing a first packaging classification. The comparison can at least include a comparison to at least one image data sample of each packaging classification. In another variation, the comparison may compare the product image data to the product image data of all or a large number of product image data of previous packaging variations. The comparison results can be analyzed to determine those that have the highest match.

Classifying the product packaging using the segmented product image data may also use text analysis. Analyzing image data of the product instance can include extracting text from the image data of the product instance by performing optical character recognition on the image data of the product instance. When determining the product presentation variation, the determination of the product presentation variation can be based at least in part on the text of the product instance. In this way text in the product packaging can be used to differentiate between different packaging. In addition to the text content, the formatting and location of the text can be characterized. In this way changes such as text positioning and sizing can be compared and used in representing different product presentation variations. This variation may be particularly useful when the differences in the product presentation variations are text-based. For example, text extracted from product image data of a first product instance can be "Nutritious" while text extracted from product image data of a second product instance can be Tasty. This method could facilitate on tracking and acting on the user-interaction impact of these changes. Text extraction may additionally be used in classifying the packaging variation.

Classifying the product packaging using the segmented product image data may also use other image properties such as color data. Analyzing image data of the product instance can include extracting a color signature from the image data of the product instance. Then, when determining the product presentation variation, the determination of the product presentation variation can be based at least in part on the color signature. The color signature could be a histogram of the product image data. This may be used in classifying the product image data as a packaging variation. This may alternatively be used as a property of the product presentation variation. For example, this may be used so that all green variations of a type of product or class of product can be analyzed. Preferably, extracting a color signature uses various approach to normalizing the image data to remove variability across different product packages, lighting conditions, cameras, and/or other factors.

In some variations, product presentation variations can be pre-specified or configured to facilitate detection of product instances matching one of the specified variations. This variation can include receiving specification of a set of pre-configured product presentation variations and wherein classifying the product packaging includes classifying the product packaging from a set of product presentation variations that includes at least the set of pre-configured product presentation variations. In other words, the classification is selected from a set of classifications that includes at least the pre-configured product presentation variations Receiving specification of the set of product presentation variations functions to register those variations such that product instances can be classified as one of those variations. Receiving specification of the set of product presentation variations can include receiving image data of a product presentation variation. In some instances, this can be packaging images such that receiving specification of the set of product presentation variations includes receiving packaging image data of a set of packaging variations. In some instances, this can include signage or other forms of marketing material image data such that receiving specification of the set of product variations. In some cases, the possible variations is closed wherein a product instance is classified as one of those variations. In other cases, it is used as a base set of variations. New variations may be dynamically detected and added in some variations.

In some variations, product presentation variation classifications are determined dynamically without prior data being supplied. In this variation, classifying the product packaging can include classifying the image data as a product presentation variation as one of a pre-existing product presentation variation classifications upon detecting a matching condition with a pre-existing product presentation variation and, upon failing to detect a matching condition, associating (e.g., classifying) the product instance with a new product presentation variation classification. The process of classifying the image data may be performed using one of the techniques described herein such as applying a CV classification model, performing image comparison, text comparison, color histogram comparison, and/or other comparison of other marketing or presentation related properties. A matching condition can be an exact match, a matching score within some define threshold, or any suitable condition. A matching condition may also depend on the distribution and previous characterization of other product images. For example, product image data of different product instances may have a set of different properties characterizing the marketing or presentation. How the mapping of one product image data fits within the distribution of other mappings can determine how it's grouped or classified and/or if a new classification is assigned.

In one variation, analyzing image data of the product instance can include analyzing image data of contextual aspects such as the arrangement and display of the product instance and/or the presence of contextual marketing elements.

Figure 8:
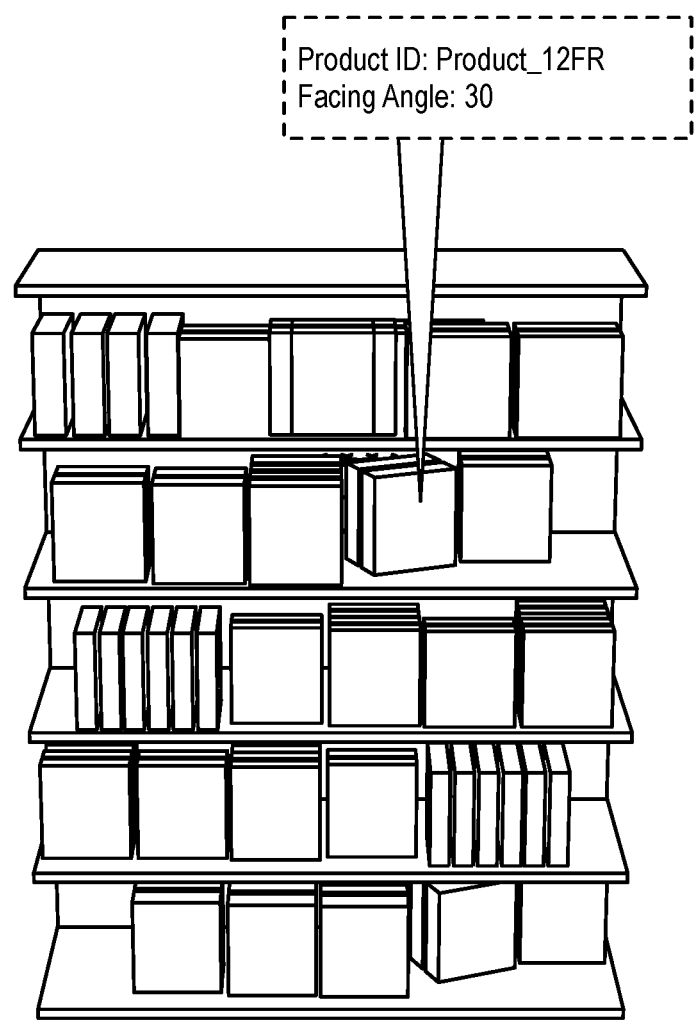
FIG. 8 is a schematic representation of determining a product arrangement property of a presentation variation of an exemplary product instance.

In one variation, analyzing image data of the product instance can include characterizing the arrangement of the product instance on a shelf. Characterizing the arrangement of the product instance can include scoring the tidiness of the product instance as shown in FIG. 8. Scoring tidiness can include calculating a measure of alignment of the face of the product instance with the front of a shelf. This may be a discrete characterization such as "front-facing", "side-facing", "askew", and the like. This may alternatively be a metric indicating how it was faced to the shelf. For example, the tidiness score could be based on the angle of the front face to the front of the shelf (e.g., zero degrees corresponding to exactly front facing and 180 degrees as backwards facing). Characterizing the arrangement of the product instance may also be a measure of the continuous shelf space devoted to a product in which a product instance is placed. Other suitable approaches to characterizing the arrangement of the product may be used.

Figure 7:
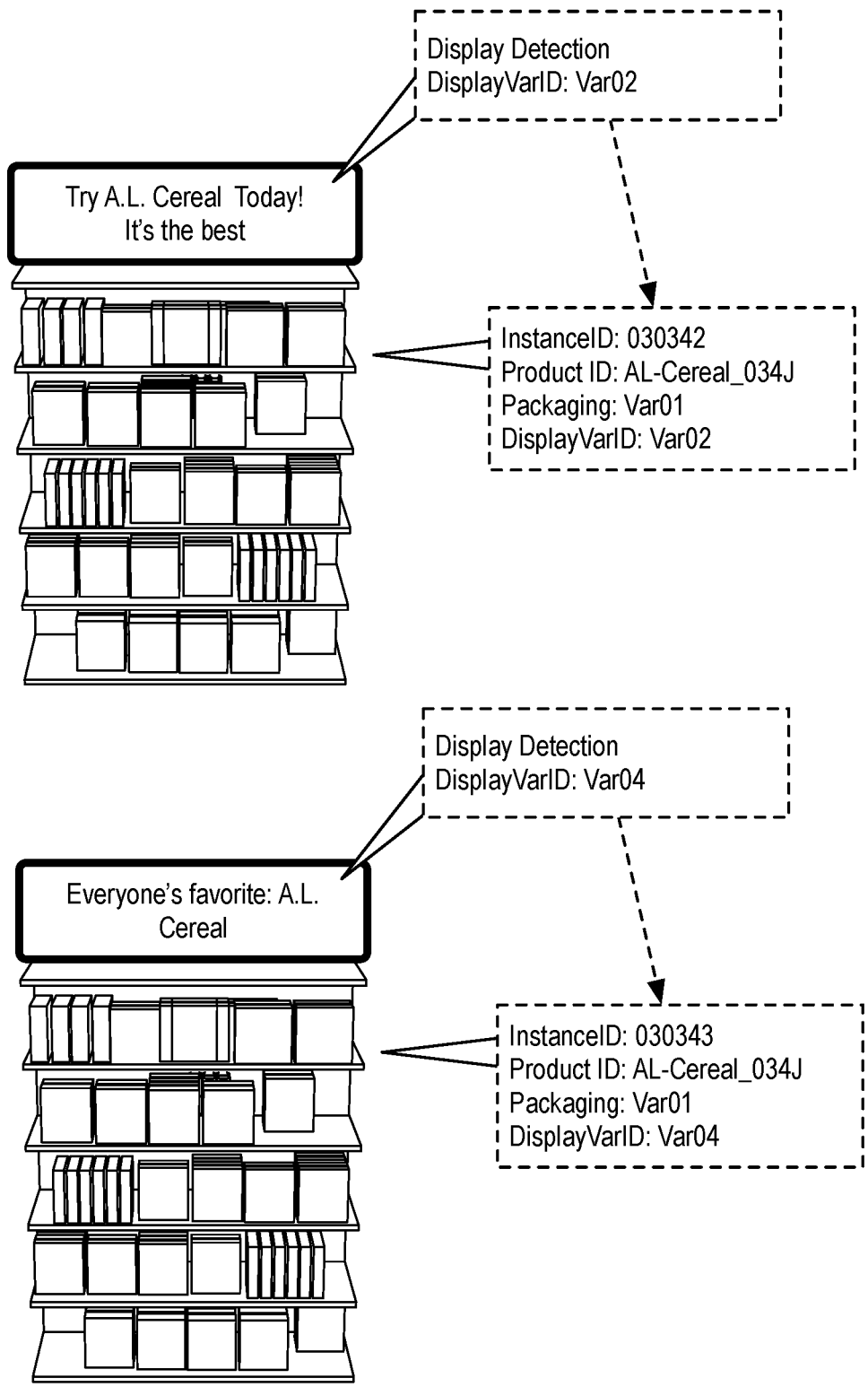
FIG. 7 is a schematic representation of determining a signage variation of an exemplary product instance.

In another variation, analyzing the image data of the product instance can include detecting presence of a proximal marketing item and characterizing the marketing item and thereby determining the product presentation variation based on the characterization of the marketing item as shown in FIG. 7.

The proximal marketing item is preferably used in creating a contextual presentation variation. A proximal marketing item can include examples such as a sign, banner, poster, a physical coupon presented in the store, a sale or promotional label, and/or other type of detectable signage or display. In one variation, the marketing item can be a digital display where the content of the display is changed. The method may be used in dynamically changing the display and/or updating the content, which can function to optimize the performance of the display content.

Characterizing the marketing item can include any of the variations applied to interpreting packaging variations. For example, the method may include: collecting image data; identifying products instances within the environment; for each product instance of the set of product instances, analyzing image data of an item instance and thereby determining a product presentation variation associated with the product instance; wherein, for each product instance of at least a subset of the set of product instances, analyzing image data of the product instance comprises detecting a marketing item instance in the image data, analyzing image data of the marketing item instance, and thereby determining the product presentation variation based on analysis of the marketing item instance; and analyzing user-item interactions associated with the product instances according to the product presentation variations.

Analyzing and detecting the marketing item instance in the image data may include detecting the marketing item instance within some proximity to the product instance. The proximity may be defined by being less than some distance from the product instance. Proximity may alternatively be defined as being detectable within image data of the camera, adjacent cameras, or any suitable set of cameras.

In general, the analysis of image data of a marketing item instance can include steps substantially similar to the variations for analyzing product packaging. Accordingly analyzing image data of the marketing item instance can include classifying image data of the marketing item as a product presentation variation. For example, this may enable the detection of a particular display advertisement being present next to a product instance. The detection and determination of a variation of a marketing item can therefore use variations such as applying a CV marketing classification model, comparison of previous marketing items, extraction and analysis of text or color, and the like. Additionally, marketing items may more easily include a graphical identifier such as a QR code or other type of identifier. This may be an explicitly detected identifier of the marketing item. As with product packaging variations, a contextual presentation variation like a marketing item can be pre-configured to facilitate detection.

Analyzing image data of the marketing item instance may additionally characterize the relationship of the marketing item to the product instance such as how they are relatively positioned (e.g., indicating a promotional sign is placed above, below, right, or left of a product) and/or displacement.

Additionally, when detecting a marketing item instance can include determining to which product instance the marketing item instance relates, which functions to only track the impact of a marketing item to relevant products which could include the products directly related to the marketing item (e.g., the product being advertised) or associated products (e.g., competing products, similar products, products commonly purchased together, and the like).

Identifying the item instance can be performed in a variety of ways such as by using an item map or planogram, receiving image labeling, CV-based item detection (or more specifically product detection), and/or other approaches.

In a CV-based item detection variation, identifying the item instance include processing the image data using a item detection CV model. The CV detection model can use uses any suitable classification technique such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes.

In another variation, labeling of the item may be received from an outside system such that the method does not explicitly perform the identification but receives identifying input from an external source. In some implementations, a human-in-the-loop processing system can manage and facilitate receiving human-assisted labeling of image data to tag different items as a specific item. In some cases, this may be used in combination with other automated detection approaches.

In an item map variation for identifying an item instance, an item map (e.g., a product map or planogram) can be used in identifying item instances, which is then used in determining product image data. In this variation, the method may include collecting image data; receiving, generating, or otherwise obtaining an item map data model; identifying an item instance in the image data using the item map; analyzing image data of the product instance and determining a product presentation variation; detecting user-item interactions associated with the set of item instances; and analyzing user-item interactions detected in the set of item instances according to the product presentation variations. The item map can be a planogram or any data model that associates a product identifier with a region of image data and/or a location in the environment. The item map can be used in identifying an item (or items) with product identifier.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: collecting image data, registering and identifying a set of product presentation variations, detecting user-item interactions associated with the set of product presentation variations, analyzing user-item interactions across the set of product presentation variations. The method may additionally include generating marketing instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: collecting image data; identifying item instances within the environment; for each item instance of the set of item instances, analyzing image data of an item instance and thereby determining a product presentation variation associated with the item instance; detecting user-item interactions associated with the item instances; and analyzing user-item interactions associated with the set of item instances according to the product presentation variations.

Figure 9:
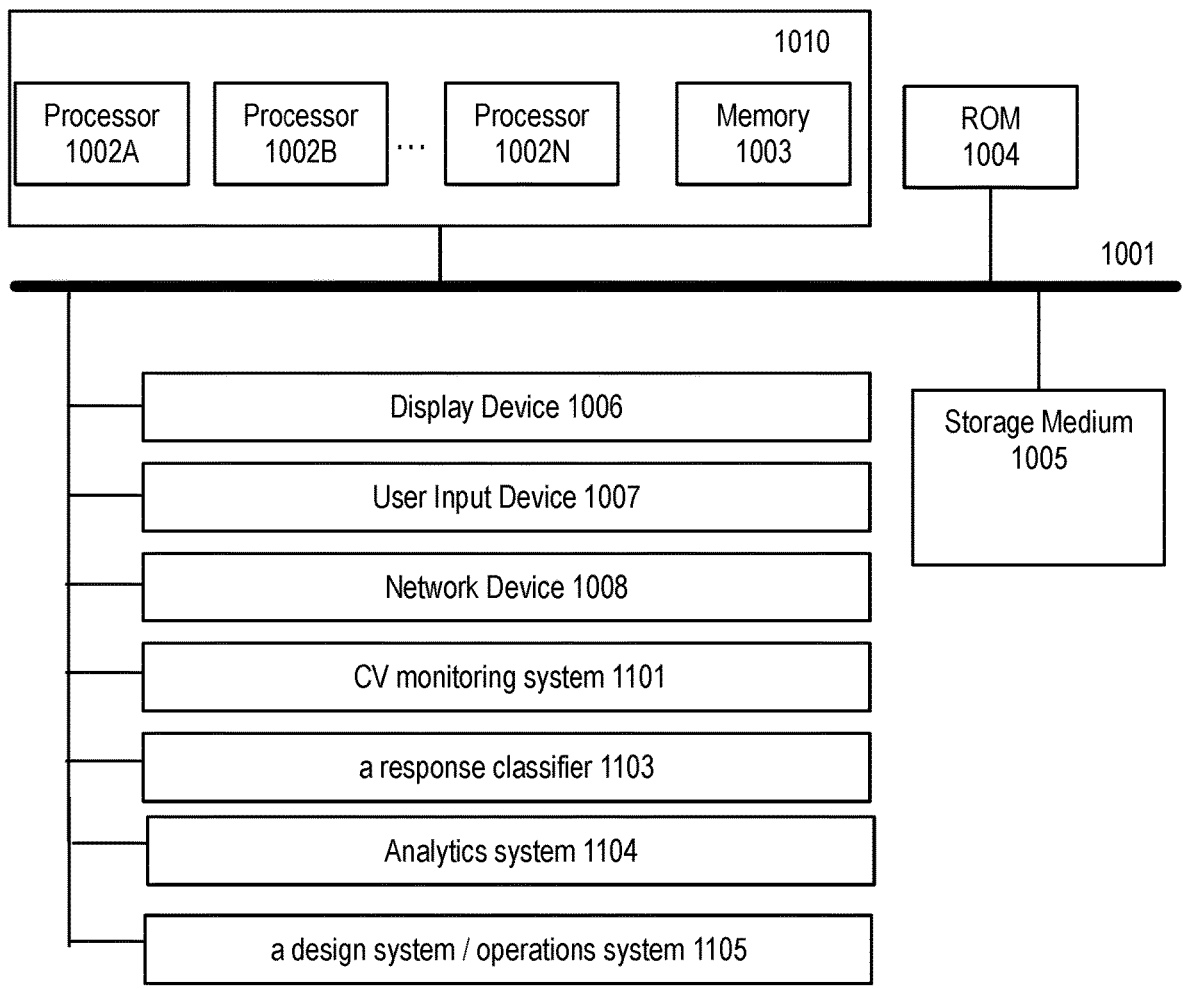
FIG. 9 is an exemplary system architecture that may be used in implementing the system and/or method.

FIG. 9 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting a CV monitoring system 1101, item registration system 1102, a response classifier 1103, an analytics system 1104, optionally a design system or operations system 1105, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method comprising:
receiving, through a registration user interface of a digital campaign management portal, input registering pre-existing product presentation variations for a set of different product scopes, which comprises at least uploading a product packaging image for each pre-existing product presentation variation;
collecting image data using a plurality of imaging devices at multiple locations across multiple retail environments;
identifying, by processing the image data, a set of product instances within the environment;
for each product instance of the set of product instances, analyzing image data of the product instance based in part on processing using a computer vision model used in comparing image data of the product instance to at least a subset of the pre-existing product presentation variations, and thereby determining a product presentation variation associated with the product instance;
detecting, using computer vision processing of the image data, user-item interactions associated with the set of product instances;
analyzing user-item interactions associated with the set of product instances according to the product presentation variations; and
within an interactive user interface of the digital campaign management portal, presenting comparative performance metrics of product presentation variations and user-item interactions of at least one product scope.

2. The method of claim 1, wherein identifying the set of product instances within the environment comprises, for each product instance of the set of product instances, identifying the product instance with a product identifier.

3. The method of claim 2, wherein analyzing user-item interactions associated with the set of product instances according to the product presentation variations comprises analyzing product instances with a shared product identifier and determining a select product presentation variation for the product identifier based on the select product presentation variation having preferred performance over other product presentation variations of the product identifier.

4. The method of claim 3, further comprising updating a marketing system with the select product presentation variation.

5. The method of claim 4, wherein the marketing system is a digital packaging design system; and wherein updating the marketing system with the select product presentation variation comprises setting a packaging digital asset within the digital packaging design system based on the selected product presentation variation.

6. The method of claim 4, wherein the marketing system is a digital display system; and wherein updating the marketing system with the select product presentation variation comprises setting the display signage based on the product presentation variation.

7. The method of claim 3, further comprising altering settings in a product operations computing system based on the select product presentation variation.

8. The method of claim 1, further comprising, for each product instance, segmenting the product instance in the image data to yield the image data of the product instance that is used in determining the product presentation variation.

9. The method of claim 8, wherein analyzing image data of the product instance further comprises classifying product packaging of the product instance as a packaging variation classification using the image data of the product instance, wherein the product presentation variation determined for the product instance is based, at least in part, on the packaging variation classification.

10. The method of claim 9, wherein classifying the product packaging as a packaging variation classification comprises applying a product packaging classification model to the image data of the product instance.

11. The method of claim 9, wherein classifying the product packaging as a packaging variation classification comprises performing product packaging comparison of the image data of the product instance and determining a product presentation variation that includes at least a packaging variation classification.

12. The method of claim 9, receiving specification of a set of pre-configured product presentation variations; and wherein classifying the product packaging comprises classifying the product packaging from a set of product presentation variations that includes at least the set of pre-configured product presentation variations.

13. The method of claim 9, wherein classifying the product packaging comprises classifying the image data as a product presentation variation as one of the pre-existing product presentation variations upon detecting a matching condition with a pre-existing product presentation variation and, upon failing to detect a matching condition, associating the product instance with a new product presentation variation.

14. The method of claim 8, wherein analyzing image data of the product instance further comprises extracting text from the image data of the product instance by performing optical character recognition on the image data of the product instance; and the product presentation variation is based at least in part on the text of the product instance.

15. The method of claim 1, wherein, for each product instance of at least a subset of the set of product instances, analyzing image data of the product instance comprises detecting a marketing item instance in the image data, analyzing image data of the marketing item instance, and thereby determining the product presentation variation based on analysis of the marketing item instance.

16. The method of claim 1, wherein, for each product instance of at least a subset of the set of product instances, analyzing image data of the product instance comprises detecting a marketing item instance in the image data, analyzing image data of the marketing item instance, and thereby determining the product presentation variation based on analysis of the marketing item instance.

17. The method of claim 1, further comprising receiving a product map data model, wherein identifying the set of product instances comprises identifying the set of product instances in the image data using the product map.

18. The method of claim 1, wherein detecting user-item interactions associated with the set of product instances comprises detecting instances of detecting user attention, detecting item pickup, and detecting a product purchase.

19. A non-transitory computer-readable medium storing instructions that, when executed by one or more computer processors of a communication platform, cause the communication platform to:
receiving, through a registration user interface of a digital campaign management portal, input registering pre-existing product presentation variations for a set of different product scopes, which comprises at least uploading a product packaging image for each pre-existing product presentation variation;
collecting image data using a plurality of imaging devices at multiple locations across multiple retail environments;
identifying, by processing the image data, a set of product instances within the environment;
for each product instance of the set of product instances, analyzing image data of the product instance based in part on processing using a computer vision model used in comparing image data of the product instance to at least a subset of the pre-existing product presentation variations, and thereby determining a product presentation variation associated with the product instance;
detecting, using computer vision processing of the image data, user-item interactions associated with the set of product instances;
analyzing user-item interactions associated with the set of product instances according to the product presentation variations; and
within an interactive user interface of the digital campaign management portal, presenting comparative performance metrics of product presentation variations and user-item interactions of at least one product scope.

20. A system comprising of:
one or more computer-readable mediums storing instructions that, when executed by the one or more computer processors, cause a computing platform to perform operations comprising:
receiving, through a registration user interface of a digital campaign management portal, input registering pre-existing product presentation variations for a set of different product scopes, which comprises at least uploading a product packaging image for each pre-existing product presentation variation;
collecting image data using a plurality of imaging devices at multiple locations across multiple retail environments;
identifying, by processing the image data, a set of product instances within the environment;
for each product instance of the set of product instances, analyzing image data of the product instance based in part on processing using a computer vision model used in comparing image data of the product instance to at least a subset of the pre-existing product presentation variations, and thereby determining a product presentation variation associated with the product instance;

detecting, using computer vision processing of the image data, user-item interactions associated with the set of product instances;

analyzing user-item interactions associated with the set of product instances according to the product presentation variations; and within an interactive user interface of the digital campaign management portal, presenting comparative performance metrics of product presentation variations and user-item interactions of at least one product scope.

* * * * *